United States Patent
Pena (10) Patent No.: US 11,452,267 B2
(45) Date of Patent: Sep. 27, 2022

(54) PLANT TRAINING DEVICE

(71) Applicant: Gabriel Pena, Flushing, MI (US)

(72) Inventor: Gabriel Pena, Flushing, MI (US)

(*) Notice: Subject to any disclaimer, the term of this patent is extended or adjusted under 35 U.S.C. 154(b) by 0 days.

(21) Appl. No.: 17/389,491

(22) Filed: Jul. 30, 2021

(65) Prior Publication Data
US 2022/0039330 A1  Feb. 10, 2022

Related U.S. Application Data

(60) Provisional application No. 63/060,902, filed on Aug. 4, 2020.

(51) Int. Cl.
*A01G 9/12* (2006.01)
*A01G 9/00* (2018.01)

(52) U.S. Cl.
CPC ........ *A01G 9/128* (2013.01); *A01G 2009/003* (2013.01)

(58) Field of Classification Search
CPC .......... A01G 17/04; A01G 17/08; A01G 9/12; A01G 9/124; A01G 9/128; B21D 7/00; F16G 11/00
USPC ............................................ 248/229.26, 308
See application file for complete search history.

(56) References Cited

U.S. PATENT DOCUMENTS

| | | | | |
|---|---|---|---|---|
| 2,366,860 A * | 1/1945 | Kraft | ...................... | B60G 11/12 403/224 |
| 3,302,328 A * | 2/1967 | King | ...................... | A01G 9/128 24/DIG. 37 |
| 5,517,794 A * | 5/1996 | Wagner | .................... | E04F 19/02 403/110 |
| 6,254,049 B1 * | 7/2001 | Goehly | .................. | A01G 17/08 248/302 |
| 6,860,454 B1 * | 3/2005 | Gronowicz, Jr. | ........ | H02G 3/30 248/67.7 |
| 9,103,119 B2 * | 8/2015 | Foderberg | ................. | E04C 2/34 |
| 9,493,946 B2 * | 11/2016 | Foderberg | ............... | B28B 23/02 |
| 10,653,079 B1 * | 5/2020 | Atkins | .................... | A01G 17/04 |

(Continued)

OTHER PUBLICATIONS

"Fully Adjustable Plant Trainer LST Bender", found at: https://www.etsy.com/listing/1015073403/fully-adjustable-plant-trainer-lst?ga_order=most_relevant&ga_search_type=all&ga_view_type=gallery&ga_search_query=plant+training&ref=sr_gallery-1-2&organic_search_click=1&frs=1 (accessed on Jul. 29, 2021).

(Continued)

*Primary Examiner* — Ebony E Evans
*Assistant Examiner* — Katelyn T Truong
(74) *Attorney, Agent, or Firm* — Christopher G. Darrow; Darrow Mustafa, PC (57) ABSTRACT

A plant training device includes a first portion including a first portion base and a plurality of angularly spaced-apart first indexing elements extending along an exterior of the first portion base. A second portion includes a second portion base having a first end and a second end opposite the first end. The second portion base defines an interior cavity structured to receive at least a portion of the first portion base therein, the interior cavity including a plurality of angularly spaced-apart recesses. Each recess is structured to complementarily slidingly engage and receive therein a first indexing element of the first portion whenever at least a portion of the first portion base is received in the second portion interior cavity at the second portion base first end, to rotationally secure the first portion and the second portion with respect to each other.

13 Claims, 6 Drawing Sheets

(56) References Cited

U.S. PATENT DOCUMENTS

| | | | | |
|---|---|---|---|---|
| 10,925,220 | B2* | 2/2021 | Lavenberg | A01G 17/04 |
| 11,129,340 | B1* | 9/2021 | Pena | A01G 9/12 |
| 2003/0051319 | A1* | 3/2003 | Herron | A01G 17/08 |
| | | | | 24/563 |
| 2006/0236602 | A1* | 10/2006 | Grunnah | A01G 9/12 |
| | | | | 47/47 |
| 2013/0219785 | A1* | 8/2013 | Ritchotte | A01G 9/12 |
| | | | | 47/45 |
| 2016/0295811 | A1* | 10/2016 | Rider | A01G 9/128 |
| 2017/0261019 | A1* | 9/2017 | Johnson | F16B 2/241 |
| 2018/0249643 | A1* | 9/2018 | Akana | A01G 9/128 |

OTHER PUBLICATIONS

"LST clip—Adjustable plant training clip V2", found at: https://www.etsy.com/listing/822195982/lst-clip-adjustable-plant-training-clip?ga_order=most_relevant&ga_search_type=all&ga_view_type=gallery&ga_search_query=ADJUSTABLE+plant+training&ref=sr_gallery-1-2&organic_search_click=1 (accessed on Jul. 29, 2021).

* cited by examiner

PLANT TRAINING DEVICE

CROSS REFERENCE TO RELATED APPLICATIONS

This application claims benefit of U.S. Provisional Application No. 63/060,902, filed on Aug. 4, 2020, which is herein incorporated by reference in its entirety.

TECHNICAL FIELD

The present invention relates to devices for facilitating and enhancing the growth of plants and, more particularly, to a plant training device enabling the growth directions of plant stems to be reoriented or adjusted to a variety of directions.

BACKGROUND

The natural growth of a plant tends to be upward towards a light source, whether it is natural sunlight or an artificial light source. In many cases, the top leaves receive most of the available light. The lower plant leaves may then be in full shade from the leaves above, or these leaves may not be facing the light source. This may result in low levels of chloroform production as a result of reduced photosynthesis. Controlling the growth footprint of the plant allows available growing space to be utilized more efficiently, by directing various portions of the plant into spaces that receive greater amounts of light. In addition, redirecting certain plant stems and leaves away from what would otherwise be their natural growth directions may provide photosensitive locations and fruit/bud sites with more sunlight. Higher levels of photosynthesis also result in high levels of plant growth and increase growth in locations of the flower and colas.

SUMMARY OF THE INVENTION

In one aspect of the embodiments described herein, a plant training device includes a first portion including a first portion base and a plurality of angularly spaced-apart first indexing elements extending along an exterior of the first portion base. The device also includes a second portion having a second portion base with a first end and a second end opposite the first end. The second portion base defines an interior cavity structured to receive at least a portion of the first portion base therein. The interior cavity includes a plurality of angularly spaced-apart recesses, with each recess structured to complementarily slidingly engage and receive therein a first indexing element of the first portion whenever at least a portion of the first portion base is received in the second portion interior cavity at the second portion base first end, to rotationally secure the first portion and the second portion with respect to each other.

In another aspect of the embodiments described herein, a plant training device includes a first portion having a first arm including a first part, a second part extending from the first arm first part, and a radiused portion formed at an intersection between the first arm first part and the first arm second part. The radiused portion has a radius of at least 7 millimeters.

DETAILED DESCRIPTION

In one or more arrangements described herein, a plant training device is provided. The device includes a first portion including a first flat stem guiding surface, and a second portion including a second flat stem guiding surface. The first portion and second portion are structured to be rotationally securable with respect to each other so as to provide any angle of a plurality of predetermined angles formed by an intersection of a first plane defined by the first guiding surface and a second plane defined by the second guiding surface. Adjustability of the angles between the first and second planes enables a plant stem secured in the plant training device to be bent or redirected to any of a variety of selectable angles, to facilitate exposure of all portions of the plant to sunlight, thereby promoting growth of the plant.

Detailed embodiments are disclosed herein; however, it is to be understood that the disclosed embodiments are intended only as examples. Therefore, specific structural and functional details disclosed herein are not to be interpreted as limiting, but merely as a basis for the claims and as a representative basis for teaching one skilled in the art to variously employ the aspects herein in virtually any appropriately detailed structure. Further, the terms and phrases used herein are not intended to be limiting but rather to provide an understandable description of possible implementations. Various embodiments are shown in FIGS. 1-6, but the embodiments are not limited to the illustrated structure or application.

It will be appreciated that for simplicity and clarity of illustration, where appropriate, reference numerals have been repeated among the different figures to indicate corresponding or analogous elements and/or features. In addition, similar reference numerals in different figures refer to elements common to the different figures. Also, numerous specific details are set forth in order to provide a thorough understanding of the embodiments described herein. However, it will be understood by those of ordinary skill in the art that the embodiments described herein can be practiced without these specific details.

FIGS. 1-4 show various views of a plant training device 20 in accordance with an embodiment described herein. In one or more arrangements, the plant training device may include a first portion 22 having a first plant stem guiding surface 22a and a second portion 24 including a second plant stem guiding surface 24a. The stem guiding surfaces 22a and 24a may be flat.

Figure 1:
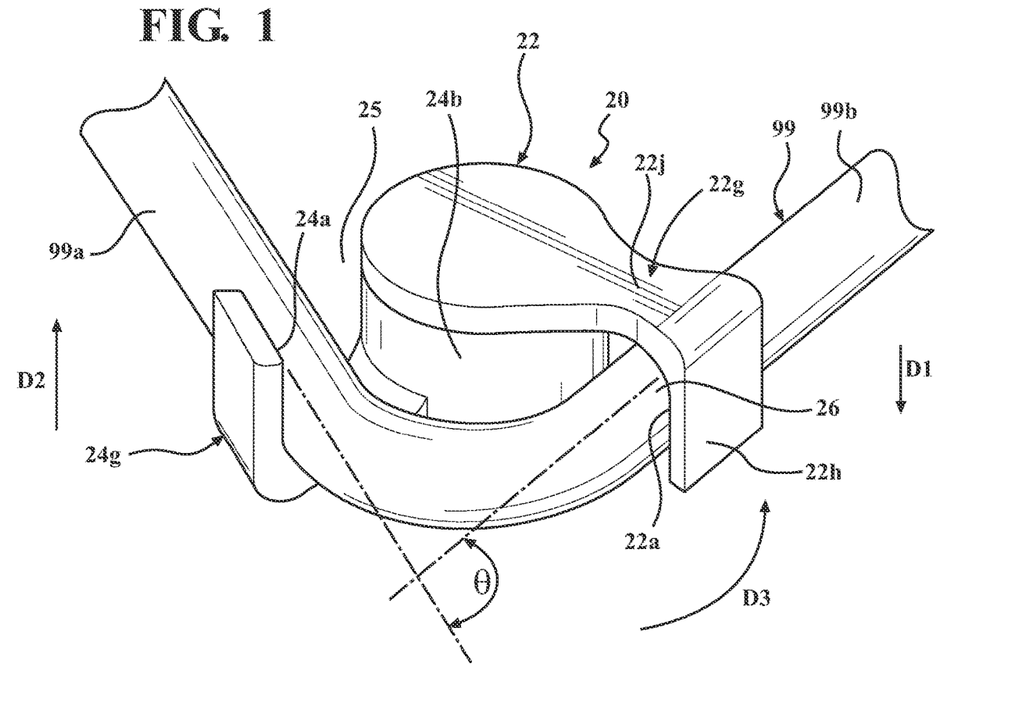
FIG. 1 is a schematic perspective view of an embodiment of a plant training device in accordance with an embodiment described herein, shown attached to a stem of a plant.
Figure 1A:
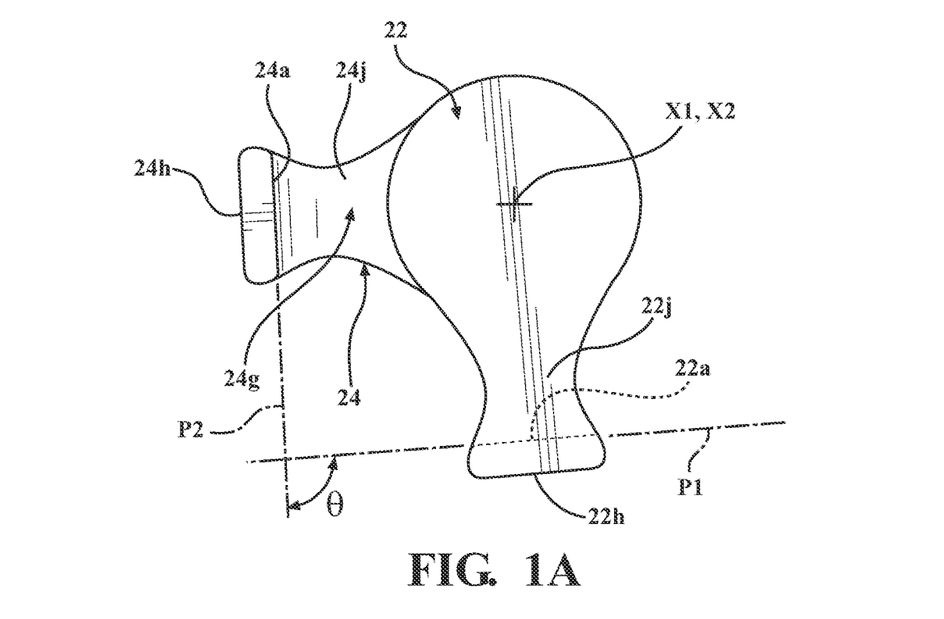
FIG. 1A is a plan view of the plant training device shown in FIG. 1.

Referring in particular to FIGS. 1-1A, the first portion 22 and second portion 24 may be structured to be rotationally securable with respect to each other so as to provide any angle θ of a plurality of predetermined angles formed by an intersection of a first plane P1 defined by the first guiding surface 22a and a second plane P2 defined by the second guiding surface 24a. In particular arrangements, successive predetermined angles of the plurality of predetermined angles may be spaced apart 30°. However, angular increments or spacings other than 30° may be used in alternative arrangements. The first and second portions 22 and 24 are considered to be rotationally secured with respect to each other if the first and second portions are unable to rotate with respect to each other when at least part of a base 22b of the first portion is inserted into an interior cavity 24c of the second portion 24 as described herein. When the first and second portions are not rotationally secured with respect to each other, they may be rotated with respect to each other to provide a desired plant stem redirection angle, as described herein.

Referring to the drawings, in one or more arrangements, the first portion 22 may include a generally cylindrical first portion base 22b having a central axis X1 and a plurality of angularly spaced-apart first indexing elements 22c extending along an exterior of the first portion base 22b. An associated first portion recess 22r may be defined between indexing elements 22c of each pair of adjacent or successive indexing elements. In one or more particular arrangements, each first portion recess 22r may be semi-cylindrical and complementary to second indexing elements 24d (described below). In one or more arrangements, the indexing elements 22c of the plurality of angularly spaced-apart first indexing elements may extend along a portion of a length L1 of the first portion base 22b to a second end 22s of the base, which is structured for insertion into a plant training device second portion interior cavity as described herein.

The second portion 24 may include a generally cylindrical second portion base 24b having a central axis X2 and defining an interior cavity 24c structured to receive at least a portion of the first portion base 22b therein. A plurality of angularly spaced-apart second indexing elements 24d may extend along the interior cavity 24c. In one or more particular arrangements, each second indexing element 24d may be semi-cylindrical and complementary to the first portion semi-cylindrical recesses 22r. An associated second portion recess 24r may be defined between indexing elements 24d of each pair of adjacent indexing elements, the second portion recesses 24r combining to form a plurality of angularly spaced-apart recesses extending along the interior cavity 24c. The first and second portions 22, 24 may be structured so that the respective central axes X1, X2 are coaxial or at least substantially coaxial (within manufacturing tolerance limits of the pertinent part dimensions) when at least a portion of the first portion base 22b is received in the interior cavity 24c. In one or more arrangements, each recess 24r of the plurality of angularly spaced-apart recesses in the second portion base interior cavity 24c may extend along an entire length L2 of the second portion base interior cavity 24c.

The second indexing elements 24d and the first portion recesses 22r may be structured so that each second portion indexing element 24d may complementarily slidingly engage (and be received within) an associated first portion recess 22r when at least a portion of the first portion base 22b is received in the second portion interior cavity 24c as described herein. Similarly, the first indexing elements 22c and the second portion recesses 24r may be structured so that each first indexing element 22c may complementarily slidingly engage and be received within an associated second portion recess 24r when at least a portion of the first portion base 22b is received in the second portion interior cavity 24c as described herein. Complementary engagement between the first indexing elements and the second portion recesses and between the second indexing elements and the first portion recesses may rotationally secure the first portion 22 and the second portion 24 with respect to each other.

The angular spacing between adjacent first indexing elements 22c may be constant or the angular spacing may vary. In particular embodiments, the angular spacing is constant, with all of the first indexing elements 22c being angularly spaced 30° apart and, consequently, all adjacent first portion recesses 22r being angularly spaced 30° apart. Similarly, all of the second indexing elements 24d may be angularly spaced 30° apart and, consequently, all of the second portion recesses 24r may be angularly spaced 30° apart. This enables the first and second portions 22, 24 to be indexed with respect to each other at 30° increments, permitting a large degree of control over the effective angle by which the plant stem is redirected or diverted.

Figure 2:
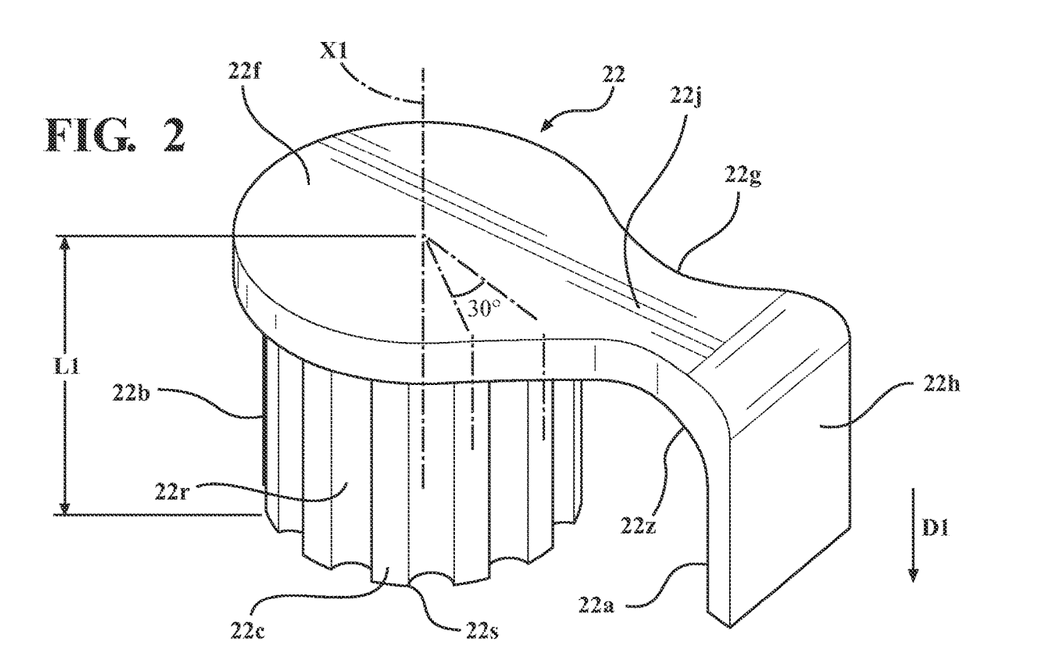
FIG. 2 is a schematic perspective view of a first portion of the plant training device shown in FIG. 1.

Referring to FIG. 2, the first portion base 22b may have a first end 22f and a second end 22s opposite the first end 22f. The first portion 22 may also have a first arm 22g extending from the first portion base 22b, with a first part 22j of the first arm extending generally radially outwardly from the first portion base 22b, and a second part 22h of the first arm 22g extending from the first part 22j in a direction D1 toward the first portion base second end 22s. The first guiding surface 22a may be formed along the second part 22h of the first arm 22g and may reside opposite the first portion base 22b. In one or more particular arrangements, part 22h of the first arm 22g may extend parallel with an exterior surface of the first portion base 22b.

As seen in the drawings, a radiused portion 22z may be formed at an intersection between the first arm first part 22j and first arm second part 22h. The radiused portion 22z may be configured to maximize the contact area between a plant stem extending into the space 26 (FIG. 1) between the first portion arm 22g and the second portion base 24b when at least a part of the first portion base 22b is received in the second portion interior cavity 24c. It has been found that maximizing the contact area between the plant stem and the first portion arm 22g operates to prevent undesirable bruising of the plant stem when the plant stem is mounted in the plant training device. The contact area between the plant stem and the radiused portion 22z of the first arm 22g may increase as the radius of the plant stem approaches the radius of the radiused portion 22z, with the radius of the radiused portion 22z initially being larger than the radius of the plant stem (and where the radius of the plant stem is a radius of a cross-section taken through the plant stem, i.e., a radius of the outer surface of the plant stem). It has been found that a radiused portion 22z having a radius of at least 7 millimeters will provide a surface having a larger radius than most plant stems which the plant training device is designed to accommodate. It has also been found that a radiused portion 22z having a radius in the range 7-15 millimeters inclusive will aid in maximizing the average contact area between the plant stem and the first arm radiused portion 22z for the range of plant stem radii which the plant training device is designed to accommodate.

Figure 3:
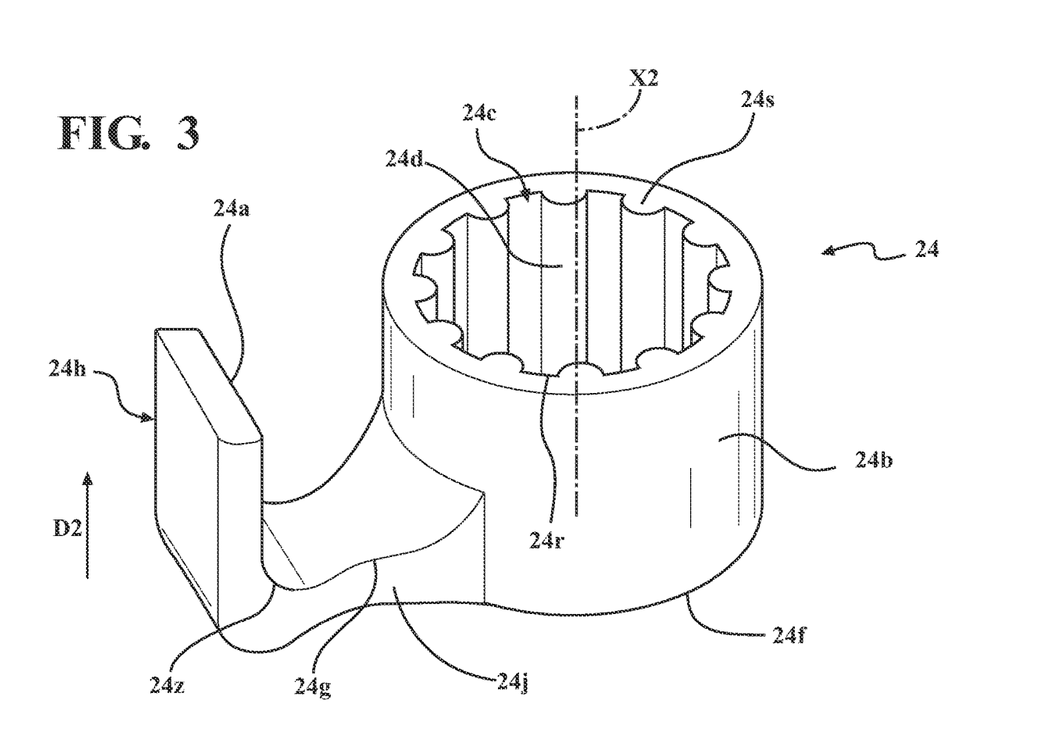
FIG. 3 is a schematic perspective view of a second portion of the plant training device shown in FIG. 1.
Figure 4:
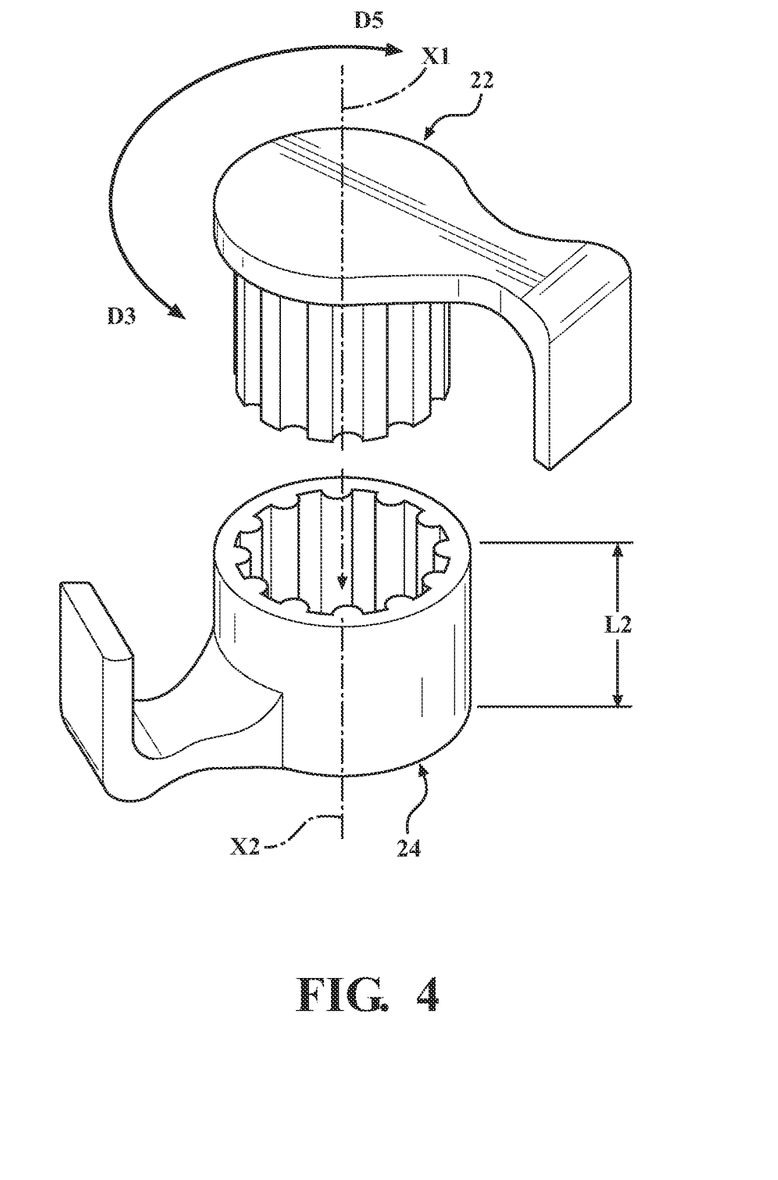
FIG. 4 is a schematic perspective view of the plant training device of FIG. 1, shown in a disassembled condition.
Figure 5:
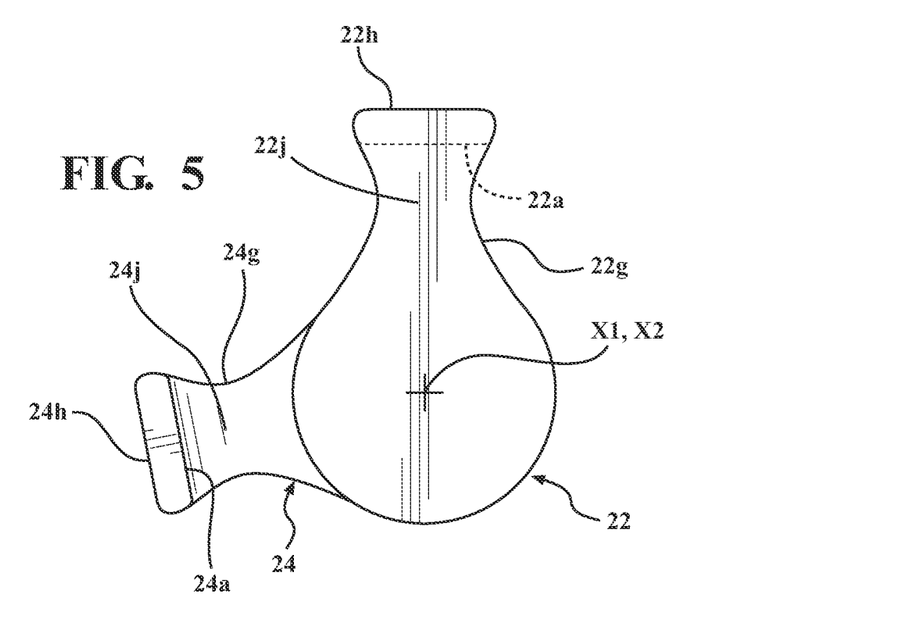
FIG. 5 is a schematic plan view of the plant training device of FIGS. 1 and 1A showing the first portion rotated with respect to the second portion rotated so as to provide a different plant stem redirection angle than shown in FIGS. 1 and 1A.
Figure 7A:
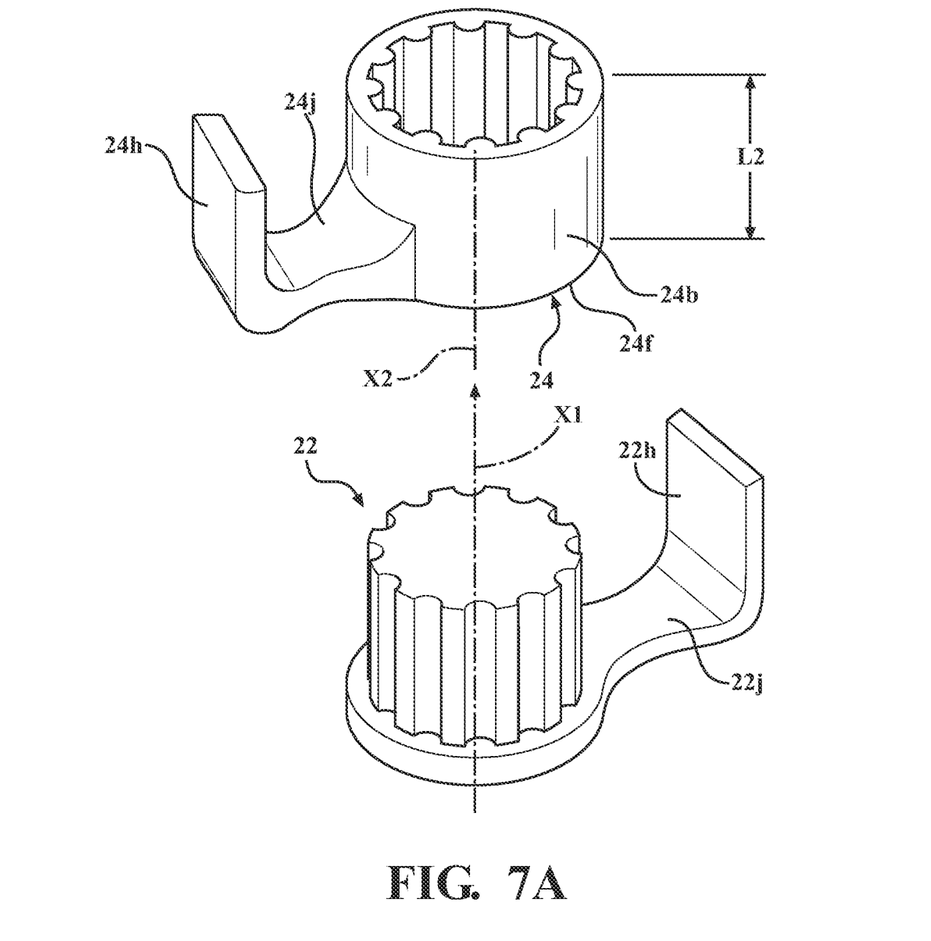
FIG. 7A is a schematic view of an alternative arrangement of the first and second portions of the plant training device shown in FIGS. 1-5, prior to insertion of a portion of the first portion into the second portion.
Figure 7B:
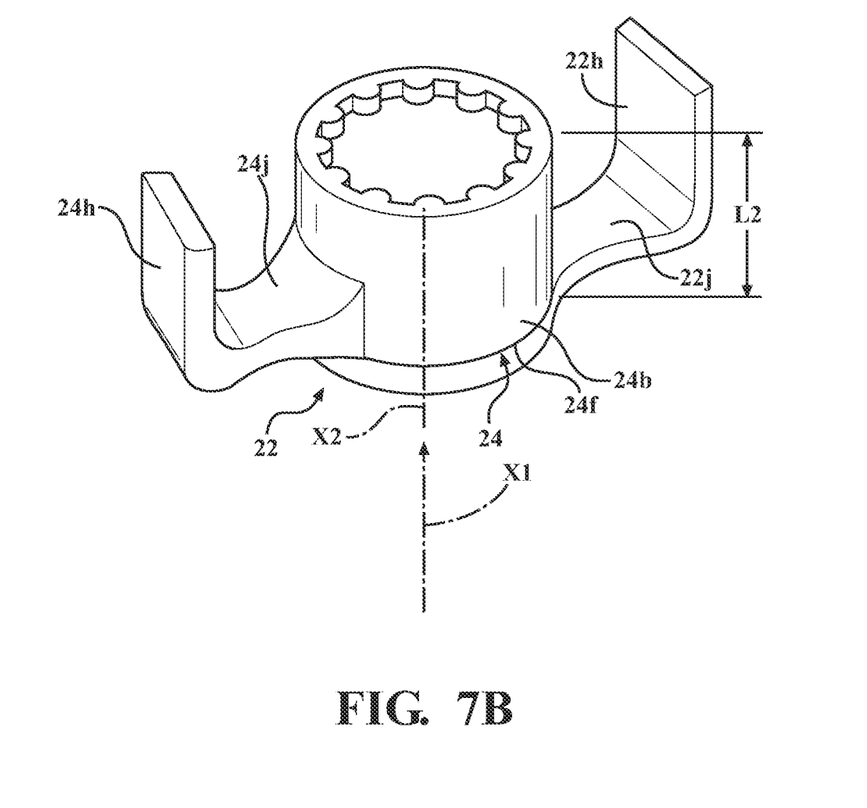
FIG. 7B is a schematic view of the alternative arrangement of the first and second portions of the plant training device shown in FIG. 7A, after insertion of a portion of the first portion into the second portion.

As seen in FIG. 3, the second portion base 24b may have a first end 24f and a second end 24s opposite the first end 24f. In addition, as seen in FIGS. 4, 7A, and 7B, the second portion interior cavity 24c may be structured to receive at least a portion of the first portion base 22b into the interior cavity through any of the second portion base first end 24f and the second portion base second end 24s. The second portion 24 may also have a second arm 24g extending from the second portion base 24b, with a first part 24j of the second arm 24g extending generally radially outwardly from the second portion base 24b, and a second part 24h of the second arm 24g extending from the first part 24j in a direction D2 toward the second portion base second end 24s. The second guiding surface 24a may be formed along part 24h of the arm 24g and may reside opposite the second portion base 24b. In one or more particular arrangements, part 24h of the second arm 24g may extend parallel with an exterior surface of the second portion base 24b.

As seen in the drawings, a radiused portion 24z may be formed at an intersection between the second arm first part 24j and second arm second part 24h. The radiused portion 24z may be configured to maximize the contact area between a plant stem extending into the space 25 (FIG. 1) between the second portion arm 24g and the second portion base 24b when at least a part of the first portion base 22b is received in the second portion interior cavity 24c. It has been found that maximizing the contact area between the plant stem and the second portion arm 24g operates to prevent undesirable bruising of the plant stem when the plant stem is mounted in the plant training device. The contact area between the plant stem and the radiused portion 24z of the second arm 24g may increase as the radius of the plant stem approaches the radius of the radiused portion 24z, with the radius of the radiused portion 24z initially being larger than the radius of the plant stem. It has been found that a radiused portion 24z having a radius of at least 7 millimeters will provide a radiused surface having a larger radius than most plant stems which the plant training device is designed to accommodate. It has also been found that a radiused portion 24z having a radius in the range 7-15 millimeters inclusive will aid in maximizing the average contact area between the plant stem and the second arm radiused portion 24z for the range of plant stem radii which the plant training device is designed to accommodate.

As shown in FIG. 1, in one or more particular embodiments, the first portion 22 and the second portion 24 may be structured so that an angle θ of the plurality of predetermined angles formed at an intersection of the planes P1 and P2 has a value of 97.9°.

FIGS. 1 and 1A show views of the plant training device 20 with the first portion base 22b inserted into the second portion interior cavity 24c at the second end 24s of the second portion base 24b. However, the same angular arrangement between the planes P1 and P2 may also be achieved by inserting the first portion base 22b into the second portion interior cavity 24c at the first end of the second portion. Thus, embodiments of the plant training device 20 may be structured so that sliding engagement between the first indexing elements 22c and the second portion indexing recesses 24r and between the second indexing elements 24d and the first portion recesses 22r as described herein may be achieved both when a portion of the first portion base 22b is inserted into the second portion interior cavity 24c at the second end 24s of the second portion base 24b, and also when a portion of the first portion base 22b is inserted into the second portion interior cavity 24c at the first end 24f of the second portion base 24b. FIG. 1 also shows an example of redirection or bending of a plant stem 99 by an embodiment of the plant training device.

Referring to FIGS. 1 and 1A, in some arrangements, the first and second portions 22, 24 may be structured so that when at least a portion of the first portion base 22b is received in the second portion base interior cavity 24c through the second portion base second end 24s, the second part 22h of the first portion arm 22g including the first guiding surface 22a and the second part 24h of the second portion arm 24g including the second guiding surface 24a extend in opposite directions. As seen from FIG. 1, when parts 22h, 24h of the first and second portion arms extend in opposite directions, the portion 99a of the plant stem 99 residing in the space 25 between the second portion arm 24g and the second portion base 24b may have difficulty moving in direction D2 out of the space 25 due to retention forces exerted by the first portion arm 22g on the stem portion 99a. Similarly, the portion 99b of the plant stem 99 residing in the space 26 between the first portion arm 22g and the second portion base 24b may have difficulty moving in a direction D1 out of the space 26 due to retention forces exerted by the second portion arm 24g on the stem portion 99b. Thus, the opposed directions of the second parts 22h, 24h of the first and second portion arms 22g, 24g help secure the plant stems 99 to the plant training device 20.

Adjustment and operation of the plant training device 20 may be understood with reference to the drawings, especially FIGS. 1 and 4. Referring to FIG. 4, the plant training device may be adjusted to provide a desired plant stem redirection angle by removing first portion base 22b from second portion interior cavity 24c and rotating the one or more of the parts with respect to each other to achieve a desired stem redirection angle. As seen from FIGS. 1 and 4, as the first portion 22 may be rotated in direction D3 with respect to the second portion 24, the degree to which the stem will be redirected will increase. When a desired angle is achieved, the first and second portions 22, 24 may be mated as previously described by inserting the first portion base 22b into the second portion interior cavity 24c to secure the parts in position to maintain the desired angle. Alternatively, the first portion 22 may be rotated in an opposite direction D5 to achieve a desired stem redirection angle.

Portion 99a of the plant stem 99 may then be inserted into space 25, wrapped around the engaged base portions 22b/24b, then passed through space 26 between the first portion arm 22g and the second portion base 24b. In the structure described, forces produced by resistance of the plant stem to bending may aid in maintaining the first and second portions in a mated condition.

In some arrangements, as seen in FIGS. 7A and 7B, the first and second portions 22, 24 may also be structured so that when at least a portion of the first portion base 22b is received in the second portion base interior cavity 24c through the second portion base first end 24f, the part 22h of the first portion arm 22g including the first guiding surface 22a and the part 24h of the second portion arm 24g including the second guiding surface 24a extend in the same direction.

Figure 6:
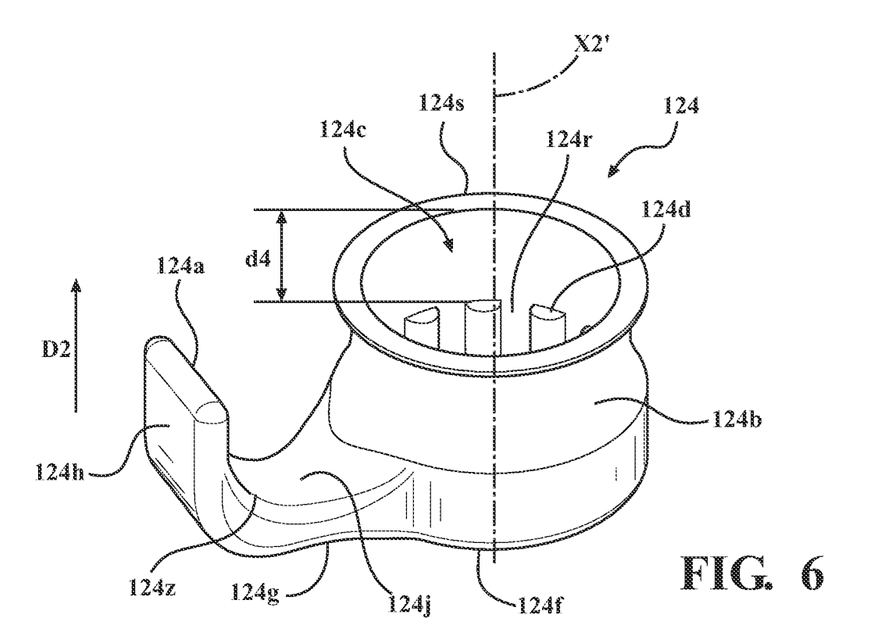
FIG. 6 is a schematic perspective view of an alternative embodiment of the second portion of the plant training device.

Referring now to FIG. 6, an alternative embodiment 124 of the second portion may be structured the substantially the same as previously described embodiment 24. The second portion 124 may include a generally cylindrical second portion base 124b having a central axis X2' and defining an interior cavity 124c structured to receive at least a portion of the first portion base 22*b* therein. A plurality of angularly spaced-apart second indexing elements 124*d* may extend along the interior cavity 124*c*. In one or more particular arrangements, each second indexing element 124*d* may be semi-cylindrical and complementary to the first portion semi-cylindrical recesses 22*r*. An associated second portion recess 124*r* may be defined between indexing elements 124*d* of each pair of adjacent indexing elements.

As seen in FIG. 6, the second portion base 124*b* may have a first end 124*f* and a second end 124*s* opposite the first end 124*f*. In addition, the second portion interior cavity 124*c* may be structured to receive at least a portion of the first portion base 22*b* into the interior cavity through any of the second portion base first end 124*f* and the second portion base second end 124*s*. However, in the second portion 124, ends of the second indexing elements 124*d* may be spaced apart a predetermined distance d4 from the second end 124*s* of the base 124*b*. This feature also has the effect of spacing the recesses 124*r* formed between pairs of adjacent second indexing elements 124*d* apart a distance d4 from the second end 124*s* of the base 124*b*. The second portion 124 may be structured to mate and engage with the first portion 22 as previously described. However, because the ends of the second indexing elements 124*d* are spaced apart from base second end 124*s*, each first indexing element 22*c* may complementarily slidingly engage and be received within an associated second portion recess 124*r* only when the first portion base 22*b* is inserted into the cavity 124*c* at the base second end 124*s* to a depth greater than the distance d4. Similarly, the second indexing elements 124*d* and the first portion recesses 22*r* may complementarily slidingly engage only when the first portion base 22*b* is inserted into the second portion interior cavity 124*c* to a depth greater than the distance d4. Also, it is only necessary to partially withdraw the first portion base 22*b* from the second portion interior cavity 124*c* in order to rotate the first portion 22 with respect to the second portion 124. This feature enables a user to maintain engagement between the first and second portions 22 and 124 during rotation of the first and second portions relative to one another when the first portion is inserted into the second portion base second end 124*s*. Thus, the user does not need to separate the first and second portions and then re-align and re-insert the first portion 22 into the second portion 124 when adjusting the redirection angle.

Opposite ends of the second indexing elements 124*d* may be positioned at or near the second portion first end 124*f* so that, when a portion of the first portion base 22*b* is inserted into the second portion interior cavity 124*c* at the second portion base first end 124*f*, the first indexing elements 22*c* and the second portion recesses 124*r* may complementarily slidingly engage as soon as the first portion base 22*b* is inserted into the second portion interior cavity 124*c*. Thus, in both embodiments 24, 124 of the plant training device second portion, the first indexing elements 22*c* and the second portion recesses 24*r*, 124*r* may complementarily slidingly engage whenever at least a portion of the first portion base 22*b* is received in a second portion interior cavity 24*c* or 124*c* at the respective second portion base first end.

The first and second portions 22, 124 may be structured so that the respective central axes X1, X2' are coaxial or at least substantially coaxial (within manufacturing tolerance limits of the pertinent part dimensions) when at least a portion of the first portion base 22*b* is received in the interior cavity 124*c*. Complementary engagement between the first indexing elements and the second portion recesses and between the second indexing elements and the first portion recesses may rotationally secure the first portion 22 and the second portion 124 with respect to each other, as previously described. Also, all of the second indexing elements 24*d* may be angularly spaced 30° apart and, consequently, all of the second portion recesses 124*r* may be angularly spaced 30° apart, as previously described. This enables the first and second portions 22, 124 to be indexed with respect to each other at 30° increments, permitting a large degree of control over the effective angle by which the plant stem is redirected or diverted.

The second portion 124 may also have a second arm 124*g* extending from the second portion base 124*b*, with a first part 124*j* of the second arm 124*g* extending generally radially outwardly from the second portion base 124*b*, and a second part 124*h* of the second arm 124*g* extending from the first part 124*j* in a direction D2 toward the second portion base second end 124*s*. The second guiding surface 124*a* may be formed along part 124*h* of the arm 124*g* and may reside opposite the second portion base 124*b*. In one or more particular arrangements, part 124*h* of the second arm 124*g* may extend parallel with an exterior surface of the second portion base 124*b*.

As seen FIG. 6, and as previously described with respect to second portion 24, a radiused portion 124*z* similar to radiused portion 24*z* may be formed at an intersection between the second arm first part 124*j* and second arm second part 124*h*. The radiused portion 124*z* may be configured as previously described to maximize the contact area between a plant stem extending into the space between the second portion arm 124*g* and the second portion base 124*b* when at least a part of the first portion base 22*b* is received in the second portion interior cavity 124*c*.

In the above detailed description, reference is made to the accompanying figures, which form a part hereof. In the figures, similar symbols typically identify similar components, unless context dictates otherwise. The illustrative embodiments described in the detailed description, and figures are not meant to be limiting. Other embodiments may be utilized, and other changes may be made, without departing from the scope of the subject matter presented herein. It will be readily understood that the aspects of the present disclosure, as generally described herein, and illustrated in the figures, can be arranged, substituted, combined, separated, and designed in a wide variety of different configurations, all of which are explicitly contemplated herein.

The terms "a" and "an," as used herein, are defined as one or more than one. The term "plurality," as used herein, is defined as two or more than two. The term "another," as used herein, is defined as at least a second or more. The terms "including" and/or "having," as used herein, are defined as comprising (i.e. open language). The phrase "at least one of . . . and . . . " as used herein refers to and encompasses any and all possible combinations of one or more of the associated listed items. As an example, the phrase "at least one of A, B and C" includes A only, B only, C only, or any combination thereof (e.g. AB, AC, BC or ABC).

Aspects herein can be embodied in other forms without departing from the spirit or essential attributes thereof. Accordingly, reference should be made to the following claims, rather than to the foregoing specification, as indicating the scope of the invention.

What is claimed is:
1. A plant training device comprising:
a first portion including a first portion base and a plurality of angularly spaced-apart first indexing elements extending along an exterior of the first portion base, the first portion base having a first end and a second end opposite the first end, the first portion also having a first arm including a first part extending from the first portion base, a second part extending from the first arm first part in a direction toward the first portion base second end, and a radiused portion extending between and connecting the first arm first part and the first arm second part, the first arm radiused portion having a radius of at least 7 millimeters and being structured to receive a portion of plant stem therein; and a second portion including a second portion base having a first end and a second end opposite the first end, the second portion base defining an interior cavity structured to receive at least a portion of the first portion base therein, the interior cavity including a plurality of angularly spaced-apart recesses, each recess being structured to complementarily slidingly engage and receive therein a first indexing element of the first portion whenever at least a portion of the first portion base is received in the interior cavity at any one of the second portion base first end and the second portion base second end, to rotationally secure the first portion and the second portion with respect to each other.

2. The plant training device of claim 1 wherein each recess of the plurality of angularly spaced-apart recesses is spaced apart from a second end of the second portion base.

3. The plant training device of claim 1 wherein the first arm radiused portion has a radius in a range of 7-15 millimeters inclusive.

4. The plant training device of claim 1 wherein the second portion has a second arm extending from the second portion base, the second arm including a first part extending from the second portion base, a second part extending from the second arm first part in a direction toward the second portion base second end, and a radiused portion extending between and connecting the second arm first part and the second arm second part, the second arm radiused portion having a radius of at least 7 millimeters and being structured to receive a portion of plant stem therein.

5. The plant training device of claim 4 wherein the second arm radiused portion has a radius in a range of 7-15 millimeters inclusive.

6. The plant training device of claim 4 wherein the first arm second part extends in a direction toward the first portion base second end, wherein a first plant stem guiding surface is formed along the first arm second part and resides opposite the first portion base, wherein the second arm second part extends in a direction toward the second portion base second end, wherein a second plant stem guiding surface is formed along the second arm second part and resides opposite the second portion base, and wherein the first portion and second portion are structured to be rotationally securable with respect to each other so as to provide any angle of a plurality of predetermined angles formed by an intersection of a first plane defined by the first guiding surface and a second plane defined by the second guiding surface.

7. The plant training device of claim 6 wherein the first portion and the second portion are structured so that an angle of the plurality of predetermined angles has a value of 97.9°.

8. The plant training device of claim 4 wherein the first and second portions are structured so that when the at least a portion of the first portion base is received in the second portion base interior cavity through the second portion base first end, the second part of the first arm and the second part of the second arm extend in the same direction.

9. The plant training device of claim 4 wherein the first and second portions are structured so that when the at least a portion of the first portion base is received in the second portion base interior cavity through the second portion base second end, the second part of the first arm and the second part of the second arm extend in opposite directions.

10. The plant training device of claim 1 wherein the first indexing elements of the plurality of first indexing elements are angularly spaced-apart 30° from each other, and wherein the recesses of the plurality of recesses are angularly spaced-apart 30° from each other.

11. The plant training device of claim 1 wherein the first portion base has a first end and a second end opposite the first end, and wherein the indexing elements of the plurality of angularly spaced-apart first indexing elements extend to along a length of the first portion base to the base second end.

12. The plant training device of claim 1 wherein each recess of the plurality of angularly spaced-apart recesses in the second portion base interior cavity extends along an entire length of the second portion base interior cavity.

13. A plant training device comprising:

a first portion including a first portion base and a plurality of angularly spaced-apart first indexing elements extending along an exterior of the first portion base; and a second portion including a second portion base having a first end and a second end opposite the first end, the second portion base defining an interior cavity structured to receive at least a portion of the first portion base therein, the interior cavity including a plurality of angularly spaced-apart recesses, each recess being structured to complementarily slidingly engage and receive therein a first indexing element of the first portion whenever at least a portion of the first portion base is received in the interior cavity at any one of the second portion base first end or the second portion base second end, to rotationally secure the first portion and the second portion with respect to each other, wherein the first portion base has a first end and a second end opposite the first end, the first portion has a first arm including a first part extending from the first portion base, a second part extending from the first arm first part in a direction toward the first portion base second end, and a radiused portion extending between and connecting the first arm first part and the first arm second part, the first arm radiused portion having a radius of at least 7 millimeters and being structured to receive a portion of plant stem therein, and wherein the second portion has a second arm extending from the second portion base, the second arm including a first part extending from the second portion base, a second part extending from the second arm first part in a direction toward the second portion base second end, and a radiused portion extending between and connecting the second arm first part and the second arm second part, the second arm radiused portion having a radius of at least 7 millimeters and being structured to receive a portion of plant stem therein.

\* \* \* \* \*